SELF-ALIGNING PRESSURE PAD FOR TAPE RECORDERS

Filed Feb. 12, 1965

Inventor
Marion R. Karecki
By Brown, Jackson, Boettcher & Dienner Att'ys.

SELF-ALIGNING PRESSURE PAD FOR TAPE RECORDERS

Filed Feb. 12, 1965

Inventor
Marion R. Karecki
By Brown, Jackson,
Boettcher & Dienner Attys.

Inventor
Marion R. Karecki
By
Brown, Jackson,
Boettcher & Dienner Attys.

United States Patent Office 3,378,266

Patented Apr. 16, 1968

3,378,266
SELF-ALIGNING PRESSURE PAD FOR TAPE RECORDERS

Marion R. Karecki, St. Joseph, Mich., assignor to V-M Corporation, Benton Harbor, Mich., a corporation of Michigan Filed Feb. 12, 1965, Ser. No. 432,298
11 Claims. (Cl. 274—11)

ABSTRACT OF THE DISCLOSURE

A pressure pad arrangement for yieldingly pressing a magnetic tape against a record-playback head including a movable support post, a bracket mounted on the support post for pivotal movement about both horizontal and vertical axes relative to the support post and thereby the record-playback head, a spring adapted to urge the bracket against the head, and a pressure pad on the bracket for yieldingly engaging the tape against the head.

The present invention relates to a self-aligning pressure pad assembly intended for use in a tape recorder for the purpose of pressing a length of tape against a record-playback head as the tape moves from one tape reel to another.

In order to record on or reproduce from a length of tape it is well known that the tape is transported from one tape reel to another and during such travel the tape is passed across a magnetic record-playback head. In such a tape recorder it is necessary to provide a pressure pad which presses the tape into contact with the magnetic head as the tape passes thereacross, the pressure pad being moved to an operative position during recording or playing and being retracted to an inoperative position at other times such as when the tape is being rewound on the original supply reel.

It is highly desirable to obtain good contact between the pressure pad and the head face in order that the moving tape will be uniformly pressed against the head face as it passes thereacross. Since magnetic heads vary somewhat in configuration, some being flat at their face while others are arcuate, and since when mounted they are not always precisely positioned, it is sometimes difficult to obtain optimum contact between the pressure pad and the magnetic head face, and it is advantageous to provide a pressure pad which can substantially conform to the precise location and contour of the head face.

Accordingly, it is an object of the present invention to provide a self-aligning pressure pad assembly which enables the pressure pad to conform to the head face thereby producing optimum contact therebetween.

It is a more specific object of the invention to provide a self-aligning pressure pad assembly wherein the pressure pad essentially floats so as to be pivotable about both a vertical axis and a horizontal axis.

These and other objects and advantages of the invention will be apparent from the following description thereof.

Now in order to acquaint those skilled in the art with the manner of utilizing and practicing my invention, I shall describe, in conjunction with the accompanying drawings, a preferred embodiment of the invention.

Figure 1:
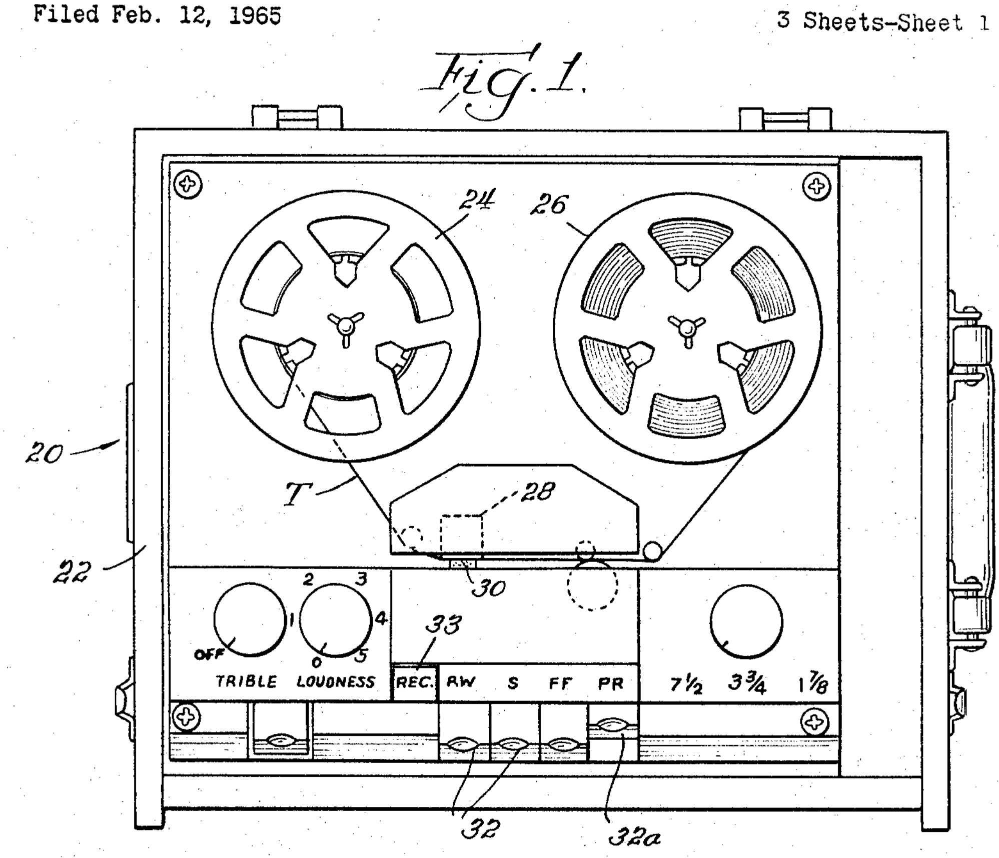
FIGURE 1 is a top plan view of a tape recorder of a type in which the pressure pad assembly of the present invention may be used to advantage.

Referring now to the drawings, FIGURE 1 shows a tape recorder 20 including a cabinet 22, left and right hand tape reels 24 and 26, a length of tape T wound on the tape reels, a magnetic head 28, a pressure pad 30 for maintaining the tape T in contact with the head 28 as the tape passes across the head, and a plurality of manually operable push buttons 32 for controlling the operation of the recorder. Each of the push buttons 32 is mounted on the outer end of a corresponding lever (not shown in FIGURE 1), and each such lever is slidable forwardly and rearwardly in a horizontal plane between inoperative and operative positions. A play-record button **32*a* is shown in its rearward operative position to which it is manually pushed in order to condition the tape recorder 20 for playing or recording, there being provided an additional button 33 which must be depressed downwardly in order to condition the magnetic head 28** for recording.

Figure 2:
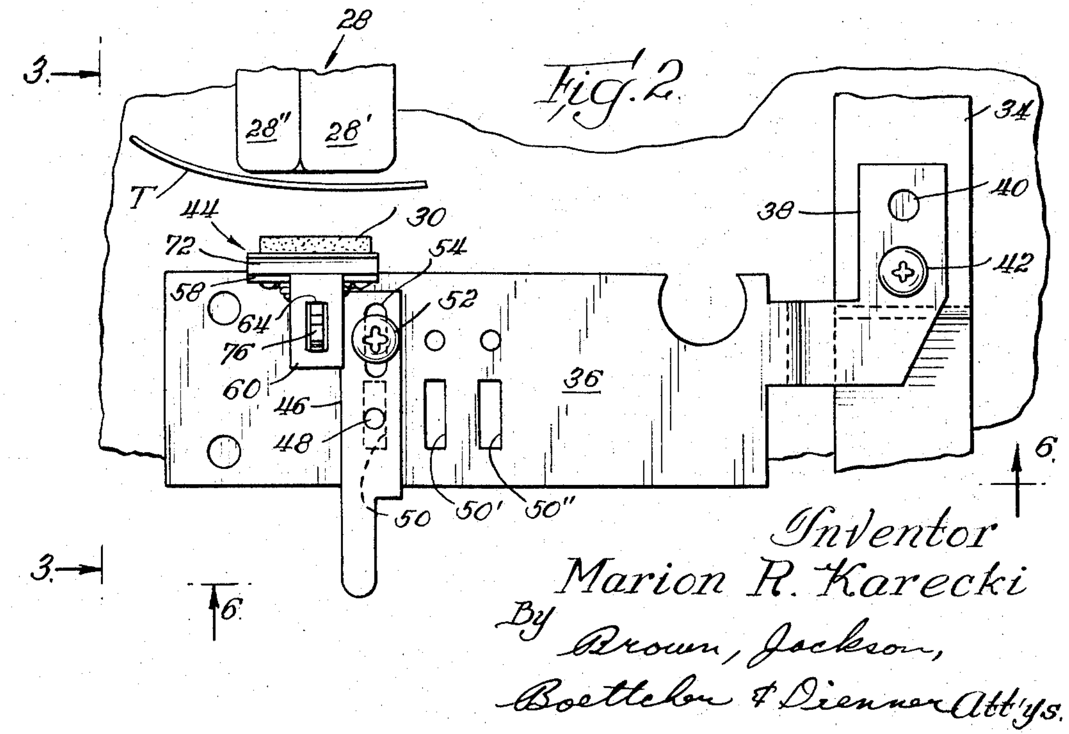
FIGURE 2 is an enlarged fragmentary top plan view showing a pressure pad assembly constructed in accordance with the present invention, the pressure pad assembly being secured to a mounting plate which in turn is carried on a play-record lever, and the pressure pad being shown in inoperative position wherein it is spaced from the magnetic head.

FIGURE 2 shows a fragmentary portion of a play-record lever 34 which carries the button **32*a* on its forward outer end and which is slidable rearwardly (upwardly as viewed in FIGURE 2) from its inoperative position shown in FIGURE 2 in order to condition the tape recorder 20 for playing or recording. A mounting plate 36 is provided with an arm 38 which is fixedly secured to the play-record lever 34. The arm 38 has a half-punch 40 which fits into an opening in the lever 34, and the arm is firmly secured to the lever by a screw 42. A pressure pad assembly 44 is secured to the top of the mounting plate 36 for movement therewith toward and away from the magnetic head 28. The pressure pad assembly 44 includes an arm 46 which had a half-punch 48 formed therein, and the half-punch 48 is adjustably disposed within a slot 50 formed in the mounting plate 36. The arm 46 is secured in position on the plate 36 by means of a locking screw 52 which extends through a slot 54 formed in the arm 46. It will thus be understood that the position of the arm 46 may be adjusted forwardly or rearwardly (downwardly or upwardly as viewed in FIGURE 2) relative to the mounting plate 36 and then locked in place by the locking screw 52**.

Figure 8:
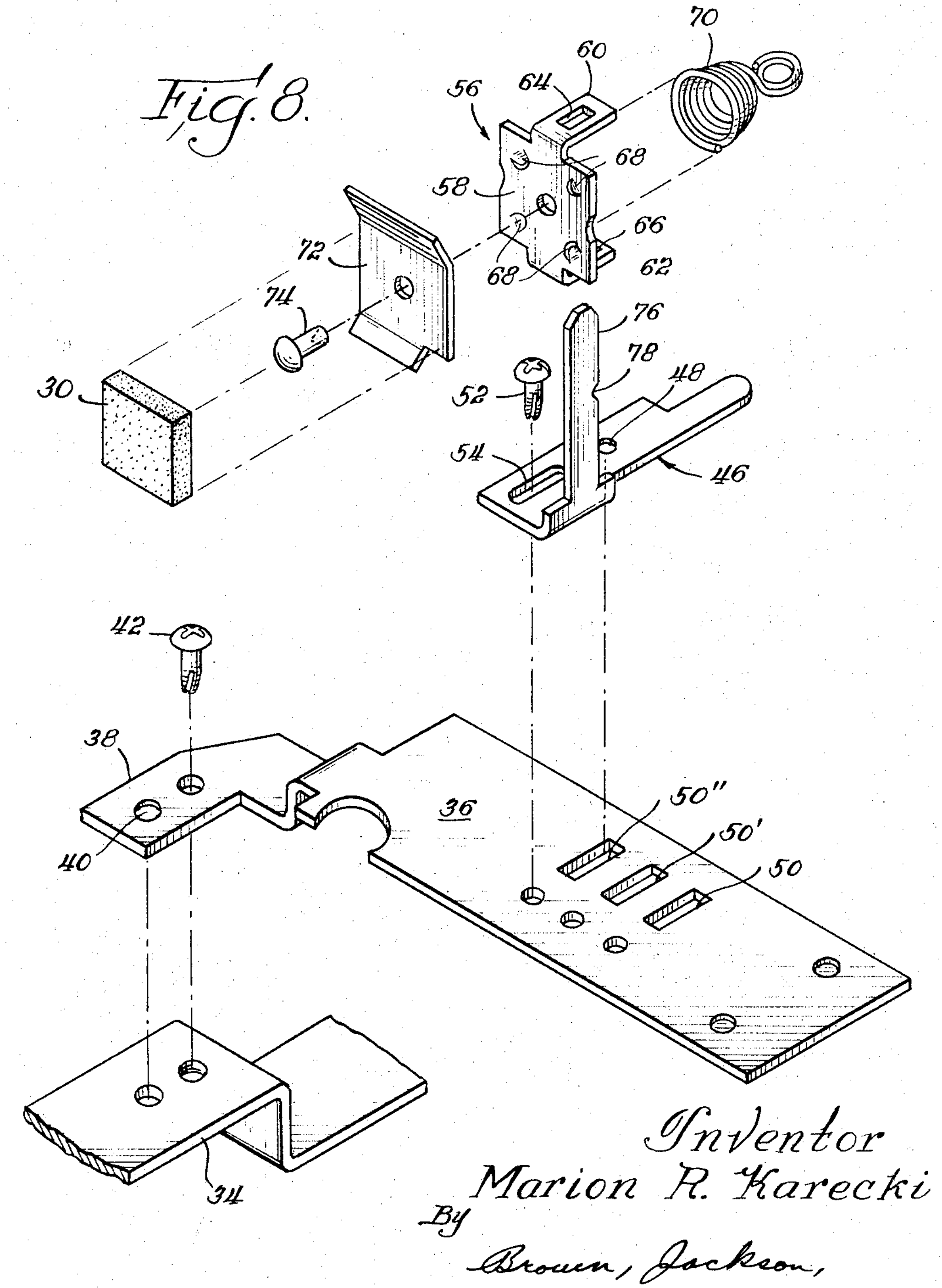
FIGURE 8 is an exploded perspective view of the pressure pad assembly of the present invention.

The mounting pad assembly 44 is shown in exploded perspective view in FIGURE 8 which illustrates a bracket 56 having a base portion 58 and a pair of vertically spaced generally horizontal arms 60 and 62. The arm 60 has a rectangular slot 64 formed therein, and the arm 62 has a similar rectangular slot 66. In addition, the base portion has four tabs 68 formed thereon, and such tabs project from the front of the base 58 for retaining one end of a conical compression spring 70. A shield 72 is secured to the opposite side of the bracket base 58 by a rivet 74. There is further shown the pad arm 46 which has integral therewith a vertical supporting post 76 which is generally rectangular in horizontal section and has a V-notch 78 formed in the front side thereof. The width of the supporting post 76 is less than the length of the slots 64 and 66 in the bracket arms 60 and 62, and the thickness of the supporting post 76 is less than the width of the slots 64 and 66.

In assembling the foregoing components, the shield 72 is secured to the bracket 56 by the rivet 74, and thereafter the felt pad 30 is secured to the face of the shield by a suitable adhesive or the like. Such components are then mounted on the supporting post 76 by passing the latter upwardly through slot 66, slipping the small end of the spring 70 over the post 76 and positioning it in the notch 78, then passing the post 76 up through slot 64, and thereafter inserting the compression spring 70 between the front face of the bracket 56 and the supporting post 76. Thus, with reference to FIGURES 5 and 6, the large end of the conical compression spring 70 is positioned against the front of the bracket base 58 so as to be retained in position by the four spaced tabs 68, while the small end of the spring abuts against the supporting post 76 so as to urge the bracket 56 rearwardly relative to the post and thus toward the magnetic head 28. The small end of the spring 70 has a portion which passes around the post 76 and is disposed within the V-notch 78 formed therein, and in this manner the small end of the spring is vertically supported relative to the post. The pad arm 46 is secured to the mounting plate 36 in the manner previously described, and the plate 36 is secured to the play-record lever 34 also as previously described. It will be noted that the mounting plate 36 is provided with alternate slots 50′ and 50″ and alternate holes adjacent thereto for the locking screw 52 so that the pad arm 46 can be mounted in a selected one of three lateral positions.

Figure 4:
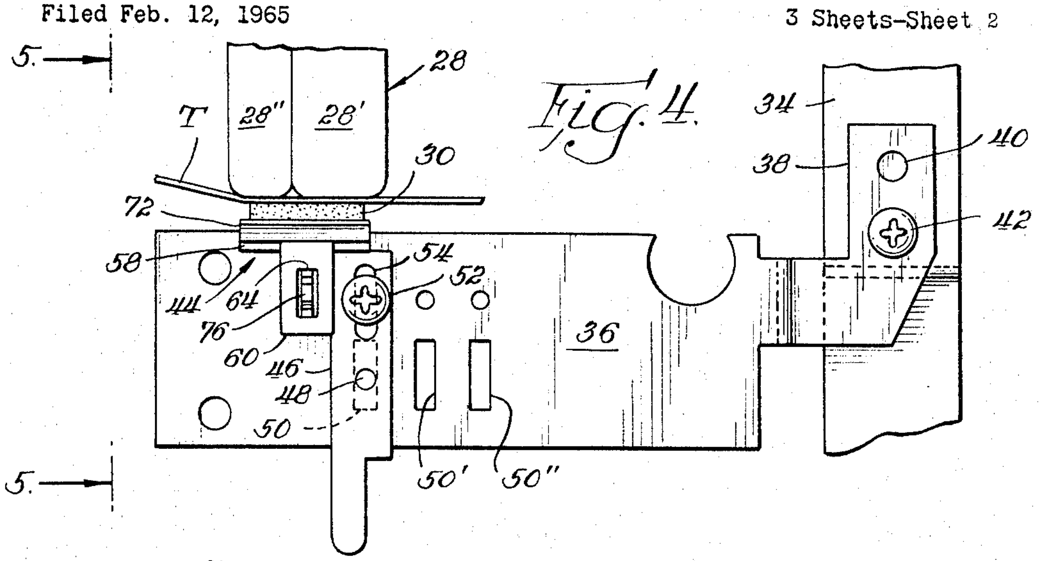
FIGURE 4 is a top plan view similar to FIGURE 2 showing the pressure pad assembly in operative position wherein the pressure pad maintains a length of tape in engagement with the magnetic head face.

In operation, the play-record lever 34 is shown in FIGURE 2 in its normal inoperative position wherein the pressure pad 30 is spaced from the magnetic head 28. In the embodiment described the head 28 comprises an assembly of a record-playback head 28′ and an erase head 28″. In this position of the pressure pad 30 the tape T is not pressed against the head, as is desired when the tape is being rewound from the right hand reel 26 to the left hand reel 24. When it is desired to play or record, the operator manually presses the button 32*a* (see FIGURE 1) so as to move the play record lever 34 rearwardly (upwardly as viewed in FIGURE 2) and thereby move the pressure pad assembly 44 toward the head 28. The play-record lever 34 is releasably maintained in its rearward operative position by suitable latch means (not shown), and in this manner the pressure pad assembly 44 is maintained in proximity to the head assembly 28 as shown in FIGURES 4 and 5 wherein the pressure pad 30 is pressed against the head 28 by the compression spring 70 thereby pressing the tape T into firm contact with the head as the moving tape passes thereover.

Figure 3:
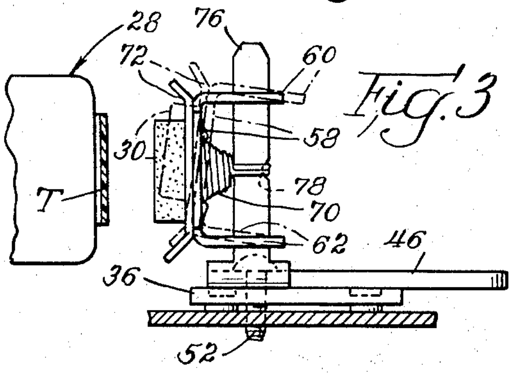
FIGURE 3 is a fragmentary side elevational view looking approximately in the direction of the arows 3—3 of FIGURE 2.
Figure 5:
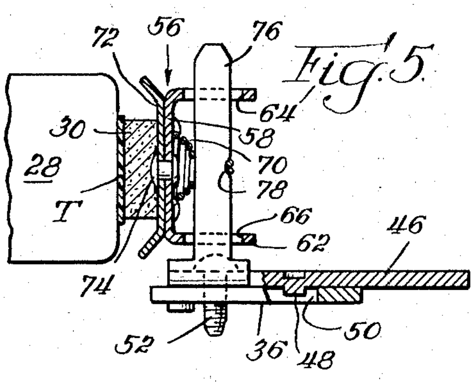
FIGURE 5 is a fragmentary side elevational view looking approximately in the direction of the arrows 5—5 of FIGURE 4.
Figures 6, 7:
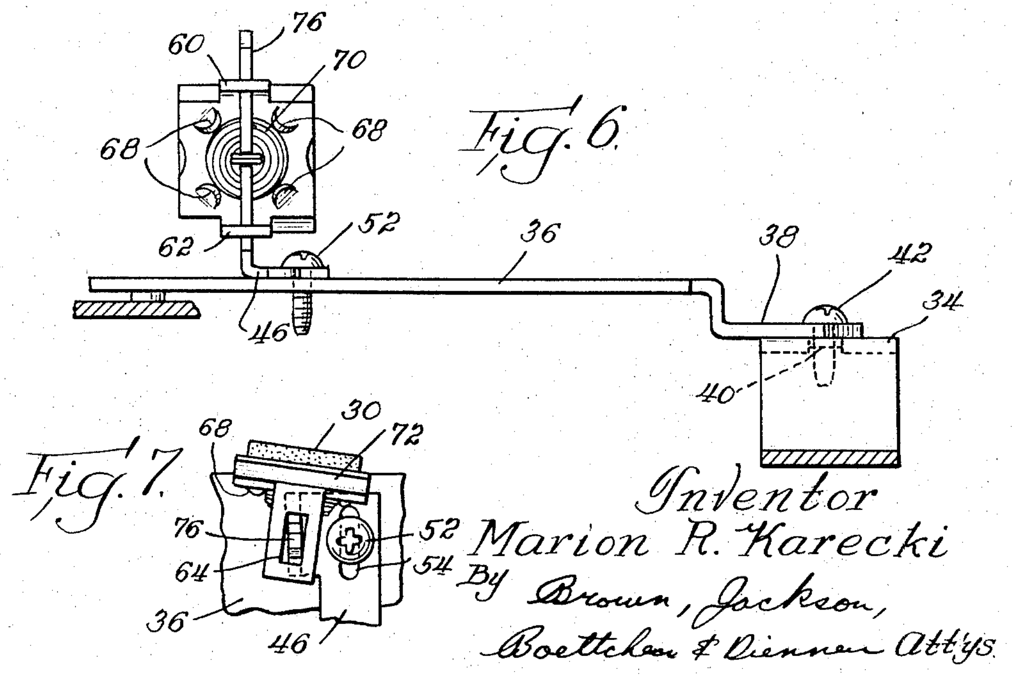
FIGURE 6 is a front elevational view of the pressure pad assembly looking approximately in the direction of the arrows 6—6 of FIGURE 2.
FIGURE 7 is a fragmentary top plan view of the pressure pad assembly illustrating the manner in which the pressure pad can pivot about a vertical axis.

With reference to FIGURE 5, it can be seen that with the pressure pad 30 pressed against the head 28 to urge the tape T thereagainst, the supporting post 76 is spaced from the ends of the slots 64 and 66 in the arms 60 and 62, and thus the pad 30 is pressed against the head 28 only by the compression spring 70 which of course is yieldable. Furthermore, because the slots 64 and 66 are greater in length than the width of the post 76, the bracket 56 which carries the pad 30 is movable forwardly and rearwardly relative to the post 76 toward and away from the head 28. It will be understood with reference to FIGURE 3 that the bracket 56 can be tilted or pivoted about a horizontal axis so that in the event the face of the head 28 is tilted somewhat the pad 30 will be permitted to conform thereto. Furthermore, with reference to FIGURES 2, 4 and 7, it will be seen that because the width of the slots 64 and 66 is greater than the thickness of the post 76, the bracket 56 is capable of pivoting about a vertical axis (as best shown in FIGURE 7). Accordingly, if the face of the magnetic head 28 is tilted somewhat about a vertical axis, the pad 30 can conform to the orientation of the head.

It will be understood from the foregoing that the pad 30 is so mounted that it in effect floats and can pivot a limited amount about both horizontal and vertical axes and thereby conform to the precise orientation of the face of the magnetic head 28. The pressure pad 30 is thus self-aligning and will adjust to any head face whether flat or curved. The bracket 56 is retained in position vertically relative to the supporting post 76 by the compression spring 70, since one end of the spring is retained by the four tabs 68 formed on the bracket 56, and the other end is retained vertically by the V-notch formed in the post 76. The pressure pad assembly 44 may also be moved relative to the mounting plate 36 toward or away from the head 28 by loosening the locking screw 52, such adjustment being permitted by the slot 50 in the plate 36 and the slot 54 in the arm 46, and the arm 46 may be positioned in various lateral positions relative to the plate 36 as evidenced by the alternate slots 50′ and 50″ and the corresponding alternate apertures for the locking screw 52.

I claim:

1. In a tape recorder of the type having a magnetic record-playback head and means for moving a length of tape across the head for recording on and reproducing from the tape, the improvement comprising a self-aligning pressure pad assembly for yieldingly pressing the tape against the magnetic head including, in combination, supporting means including a supporting post which is movable toward and away from the magnetic head of the tape recorder, bracket means mounted on said supporting post for movement therewith, said bracket means being pivotally movable about both horizontal and vertical axes relative to said supporting post, a spring connected between said bracket means and said supporting post which reacts against said pivotal movements and urges said bracket means toward said magnetic head, and a pressure pad carried on said bracket means for yieldingly pressing the tape against the magnetic head as it passes thereacross.

2. In a tape recorder of the type having a magnetic record-playback head and means for moving a length of tape across the head for recording on and reproducing from the tape, the improvement comprising a self-aligning pressure pad assembly for yieldingly pressing the tape against the magnetic head including, in combination, supporting means including a movable supporting post which is disposed generally in front of the magnetic head of the tape recorder, bracket means mounted on said supporting post for movement therewith, said bracket means being pivotable on said supporting post through a pair of planes one of which extends longitudinally and the other of which extends transversely of the direction of tape movement past the head, a compression spring mounted between said bracket means and said supporting post which reacts against said pivoting and urges said bracket means toward said magnetic head, and a pressure pad carried on said bracket means for yieldingly pressing the tape against the magnetic head as it passes thereacross.

3. In a tape recorder of the type having a magnetic record-playback head and means for moving a length of tape across the head for recording on and reproducing from the tape, the improvement comprising a self-aligning pressure pad assembly for yieldingly pressing the tape against the magnetic head including, in combination, supporting means including a supporting post which is movable toward and away from the magnetic head of the tape recorder, bracket means mounted on said supporting post for movement therewith, said bracket means having a pair of spaced generally parallel arms each having a slot therein for receiving said supporting post which extends through both of said slots, said bracket means being pivotable about both horizontal and vertical axes relative to said supporting post, a spring connected between said bracket means and said supporting post which urges said bracket means toward said magnetic head, and a pressure pad carried on said bracket means for yieldingly pressing the tape against the magnetic head as it passes thereacross.

4. The invention of claim 3 wherein the length of said slots is greater than the width of said supporting post and wherein the width of said slots is greater than the thickness of said supporting post.

5. The invention of claim 3 wherein said spring comprises a compression spring mounted between said bracket means and said supporting post.

6. The invention of claim 3 wherein said supporting post is generally rectangular in cross section and wherein the length of said slots is greater than the width of said supporting post and the width of said slots is greater than the thickness of said supporting post.

7. In a tape recorder of the type having a magnetic record-playback head and means for moving a length of tape across the head for recording on and reproducing from the tape, the improvement comprising a self-aligning pressure pad assembly for yieldingly pressing the tape against the magnetic head including, in combination, supporting means including a supporting post which is movable toward and away from the magnetic head of the tape recorder, said supporting post being generally rectangular in cross section, bracket means having a pair of spaced generally parallel arms each having a slot therein for receiving said supporting post which extends through both of said slots, the length of said slots being greater than the width of said supporting post and the width of said slots being greater than the thickness of said supporting post, said bracket means being pivotable about both horizontal and vertical axes relative to said supporting post, a compression spring mounted between said bracket means and said supporting post which urges said bracket means toward said magnetic head, and a pressure pad carried on said bracket means for yieldingly pressing the tape against the magnetic head as it passes thereacross.

8. The invention of claim 7 wherein one end of said compression spring is anchored relative to said bracket and the other end of said compression spring is anchored relative to said supporting post whereby said spring provides yielding support for said bracket relative to said supporting post in the lengthwise direction of the latter.

9. The invention of claim 7 wherein each of said slots is rectangular.

10. In a tape recorder of the type having a magnetic record-playback head and means for moving a length of tape across the head for recording on and reproducing from the tape, the improvement comprising a self-aligning pressure pad assembly for yieldingly pressing the tape against the magnetic head including, in combination, supporting means including a vertical supporting post which is movable toward and away from the magnetic head of the tape recorder, said supporting post being generally rectangular in horizontal section, bracket means having a pair of vertically spaced generally horizontal arms each having a generally rectangular slot therein for receiving said supporting post which extends upwardly through both of said slots, the length of said slots being greater than the width of said supporting post and the width of said slots being greater than the thickness of said supporting post, said bracket means being pivotable about both horizontal and vertical axes relative to said supporting post, a compression spring mounted between said bracket means and said supporting post which urges said bracket means toward said magnetic head, one end of said spring being vertically anchored relative to said bracket and the other end of said spring being vertically anchored relative to said supporting post whereby said spring provides yielding vertical support for said bracket relative to said post, and a pressure pad carried on said bracket means for yieldingly pressing the tape against the magnetic head as it passes thereacross.

11. The invention of claim 10 wherein said supporting means includes an arm which is integral with said supporting post and is adjustably secured to a mounting plate which in turn is carried on a play-record lever of said tape recorder.

References Cited

UNITED STATES PATENTS

| | | | |
|---|---|---|---|
| 2,644,690 | 7/1953 | Krag | 274—4 |
| 2,957,049 | 10/1960 | Uritis | 274—4X |
| 3,157,868 | 11/1964 | Buslik | 179—100.2 |
| 3,278,188 | 10/1966 | Chamberlin | 274—11 |

WILLIAM D. MARTIN, Jr., *Primary Examiner.*